UNITED STATES PATENT OFFICE.

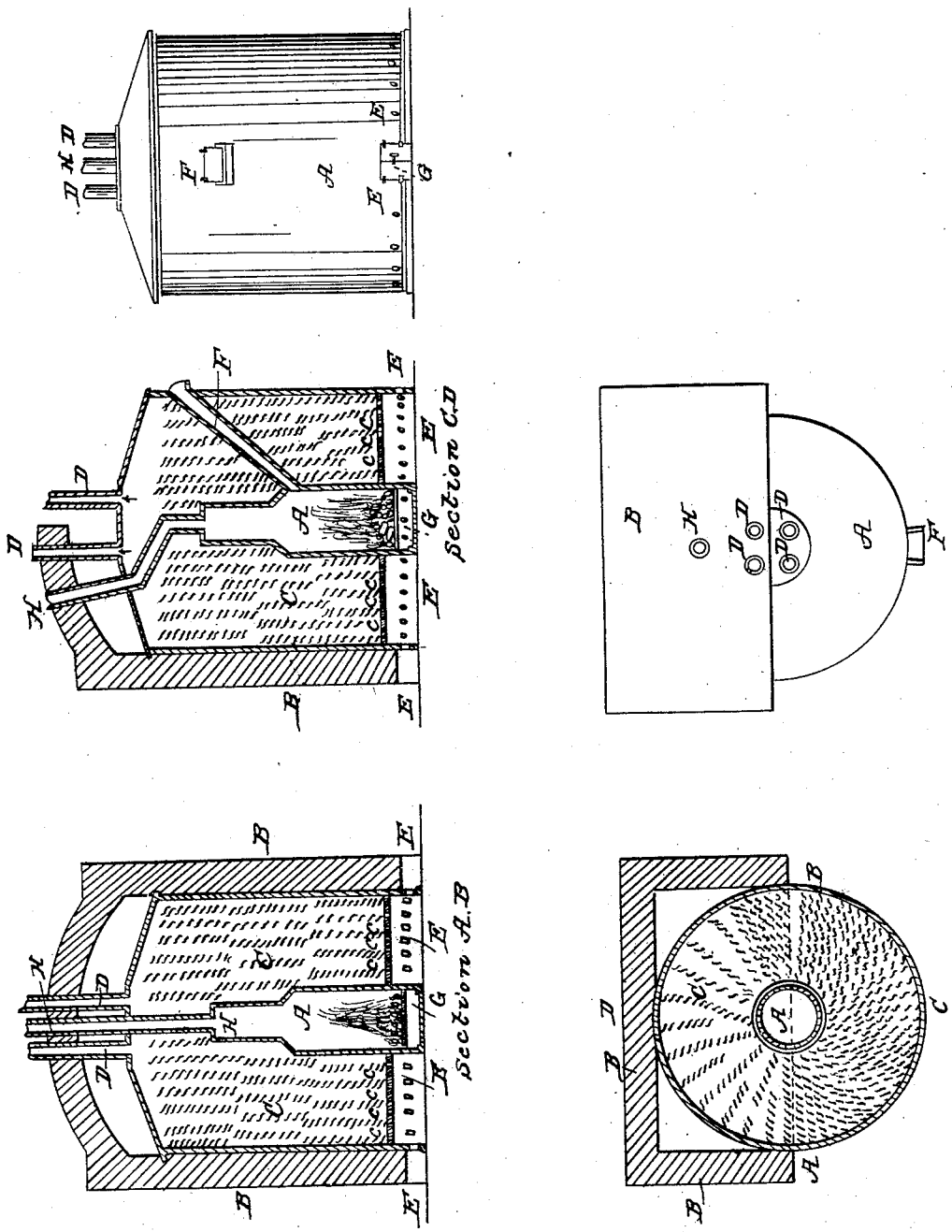

JAMES BOLTON, OF RICHMOND, VIRGINIA, ASSIGNOR TO CHAS. D. YALE.

HOT-AIR FURNACE.

Specification of Letters Patent No. 9,686, dated April 26, 1853.

*To all whom it may concern:*

Be it known that I, JAMES BOLTON, doctor of medicine, of the city of Richmond, county of Henrico, and State of Virginia, have invented a new and useful Improvement in the Construction of Warm-Air Chambers of Furnaces, Stoves, or other Heating Contrivance, of which the following is a full and exact description, reference being had to the accompanying drawing and to the letters of reference marked thereon.

The nature of my invention consists in packing the space called the air chamber between the stove furnace or other heating contrivance and the wall which incloses said chamber with metallic scraps twisted into a spiral form or bent into other shape so as to allow a space between these scraps for the passage of air, these scraps possessing the property of conducting heat and of absorbing that which is radiated and of imparting the heat to the air within the chamber.

To enable others to use my invention and to comprehend its advantages I proceed to describe its construction and the philosophical principles on which it is founded.

I construct my air chamber in the ordinary way viz by inclosing a stove furnace or pipe with a single or double wall of brick or other suitable material leaving a space to be occupied by the air which is to be heated. I prefer, however, (for reasons which will readily be understood hereafter,) to make this space much larger than usual. I then pack the chamber with strips of sheet iron twisted into a spiral form so as to allow the passage of air between them as shown at letter C in the accompanying drawing. The effects thus produced are as follows: The scraps of iron as above described lying in contact with the stove furnace or pipe become heated and by conduction heat those in contact with them and so on through the whole mass by which the air chamber is filled. The mass becomes heated by absorbing radiant heat also. Through this mass the air is compelled to permeate before it can escape into the flues designed to conduct it.

The principle in natural philosophy on which this invention is founded is the following: That the temperature of air is not affected by radiant heat and absorbs caloric only by contact with a heated body. In the ordinary hot air furnace the whole body of air lying between the furnace and the opposite walls being exposed to radiant heat only has its temperature unaffected, the thin strata touching these warm surfaces being the only part heated. The advantages of the warm air chamber which I have invented are chiefly the following: The air is exposed to an immense heating surface in addition to the usual surfaces of the furnace and walls which inclose the chamber. This additional heating surface may be increased to any extent which the stove or heating contrivance may be capable of heating. It is also evident that the air must be detained in the chamber and has therefore the opportunity of absorbing more caloric than it would if it had a free passage through; at the same time being agitated in its passage through the chamber fresh particles must be continually brought into contact with the heating surfaces. In addition to these the following facts enhance greatly its utility. It may be used in combination with any furnace now in use or with any stove or pipe and may consequently be adapted to the means of nearly all classes of the community. The great mass of heating material being below a red heat and by conduction diminishing the heat of the furnace there must be less risk of the offensive empyrematic odor which often arises from hot air furnaces.

What I claim as my own invention and desire to secure by Letters Patent is—

Packing the air chamber connected with any contrivance for heating the air which it contains with spiral metallic scraps or scraps of metal bent into other shapes by which the same effect is produced these scraps being designed for the conduction of heat and absorption of radiant heat whether they be loose or connected with the adjacent walls or heating contrivance.

JAMES BOLTON. [L. S.]

Witnesses:
 GEO. H. CULVER,
 GEO. R. CANNON.